(12) United States Patent
Tamura et al.

(10) Patent No.: US 6,990,340 B2
(45) Date of Patent: Jan. 24, 2006

(54) COMMUNICATION SYSTEM, COMMUNICATION METHOD AND SWITCHING NODE

(75) Inventors: Toshiyuki Tamura, Tokyo (JP); Masahiro Sawada, Kanagawa (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 899 days.

(21) Appl. No.: 09/899,816

(22) Filed: Jul. 9, 2001

(65) Prior Publication Data

US 2002/0077065 A1 Jun. 20, 2002

(30) Foreign Application Priority Data

Dec. 14, 2000 (JP) .............................. 2000/380458

(51) Int. Cl.
*H04B 1/00* (2006.01)
*H04B 1/38* (2006.01)
*H04Q 7/20* (2006.01)

(52) U.S. Cl. ..................... 455/432.2; 455/436; 455/72; 455/560

(58) Field of Classification Search ................. 455/72, 455/432.2, 436, 437, 442, 443, 560
See application file for complete search history.

(56) References Cited

U.S. PATENT DOCUMENTS

| 5,956,673 A * | 9/1999 | Weaver et al. ............... 704/221 |
| 6,556,844 B1 * | 4/2003 | Mayer ......................... 455/560 |
| 2003/0032440 A1 * | 2/2003 | Sato et al. .................... 455/517 |

OTHER PUBLICATIONS

Siemens, "Through Connection and lu User Plane Initialization during TrFO establishment", TrFO/TFO Workshop #2, Jul. 18, 2000, Helsinki, Finland.*
NEC, "SRNS Relocation During the TrFO Connection", TrFO Workshop, Aug. 28, 2000, Seattle, USA.*

* cited by examiner

*Primary Examiner*—Harry S. Hong
(74) *Attorney, Agent, or Firm*—McGinn IP Law Group, PLLC (57) ABSTRACT

A transcoder of a switching node MSC of a core network is inserted into a connection call of a transcoder-free-operation on the basis of an answer from a switching node RNC of a radio access network against an inquiry about a setting information of transcoder performed by the switching node MSC in a user layer of a Iu interface to insert a tone signal, etc., into the connection call of transcoder-free-operation. The insertion of transcoder into a connection call of a transcoder-free-operation can be executed without performing a re-initializing procedure.

11 Claims, 9 Drawing Sheets

COMMUNICATION SYSTEM, COMMUNICATION METHOD AND SWITCHING NODE

BACKGROUND OF THE INVENTION

1. Field of the Invention

The present invention relates to an interface between a network for transmitting a bandwidth-compressed signal and a network for transmitting a signal which is not bandwidth-compressed. Particularly, in an interface between a switching node of a core network, which is connected to a communication network and use to decode the bandwidth-compressed audio signal transmitted through a radio access network and a switching node of the radio access network, which is connected to the communication to transmit a bandwidth-compressed audio signal, the present invention relates to an insertion control of a transcoder, which is provided in the switching node of the core network. Incidentally, the switching node of the radio access network is referred to a RNC (Radio Network Controller) and the switching node of the core network having the transcoder may be a MSC (Mobile Switching Center) or a MGS (Media Gateway Server), which has a gateway switching function. Since these switching nodes, that is, the MSC and the MGS, are the same in an insertion control operation of the transcoder except functional roles thereof in the core network, the MSC will be described as a typical example of the switching node of the core network, which includes the transcoder.

2. Description of the Related Art

Figure 8:
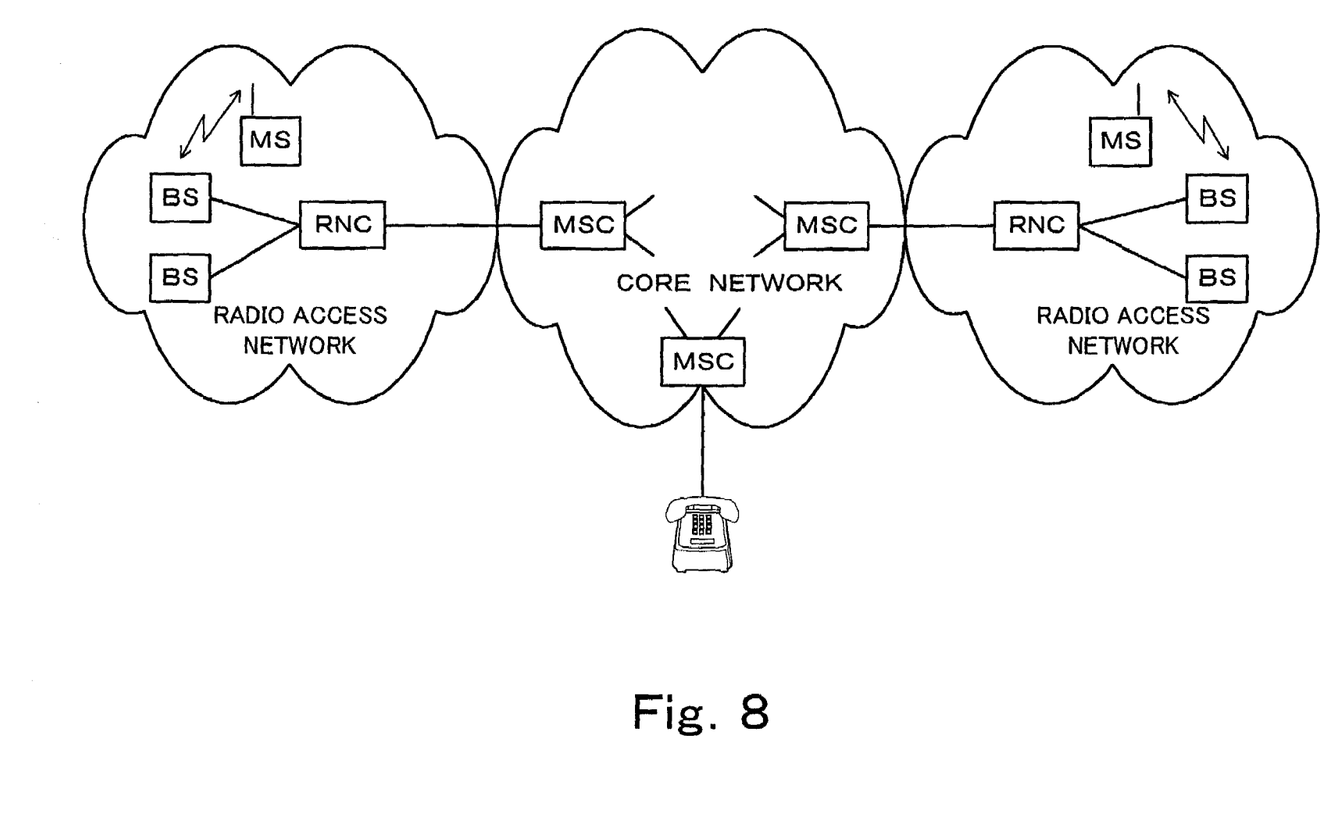
FIG. 8 shows a system construction of a mobile communication system to which the present invention is applied.

A new mobile communication system has been proposed, which is constructed with a core network provided as a fixed network, for performing a position control, a call control and a service control and at least one radio access network for controlling and terminating a radio technology and has an interface between the RNC of the radio access network and the MSC of the core network, defined as user interface Iu. The Iu interface is defined as having a hierarchical structure constructed with a control layer in which the switching nodes exchange control signals and a user layer in which users exchange transmitting signals and control signals. The user layer is constructed with a portion for transmitting a transmitting signal such as audio signal or data as AAL2 cell of an ATM (Asynchronous Transfer Mode) and a portion including a control signal for performing a negotiation between users. When a communication is performed between a calling terminal and a called terminal, audio signal or data signal is transmitted and received as a ATM packet signal after the negotiation is performed between the terminals by using the user layer. This communication system is shown in FIG. 8.

Figure 9:
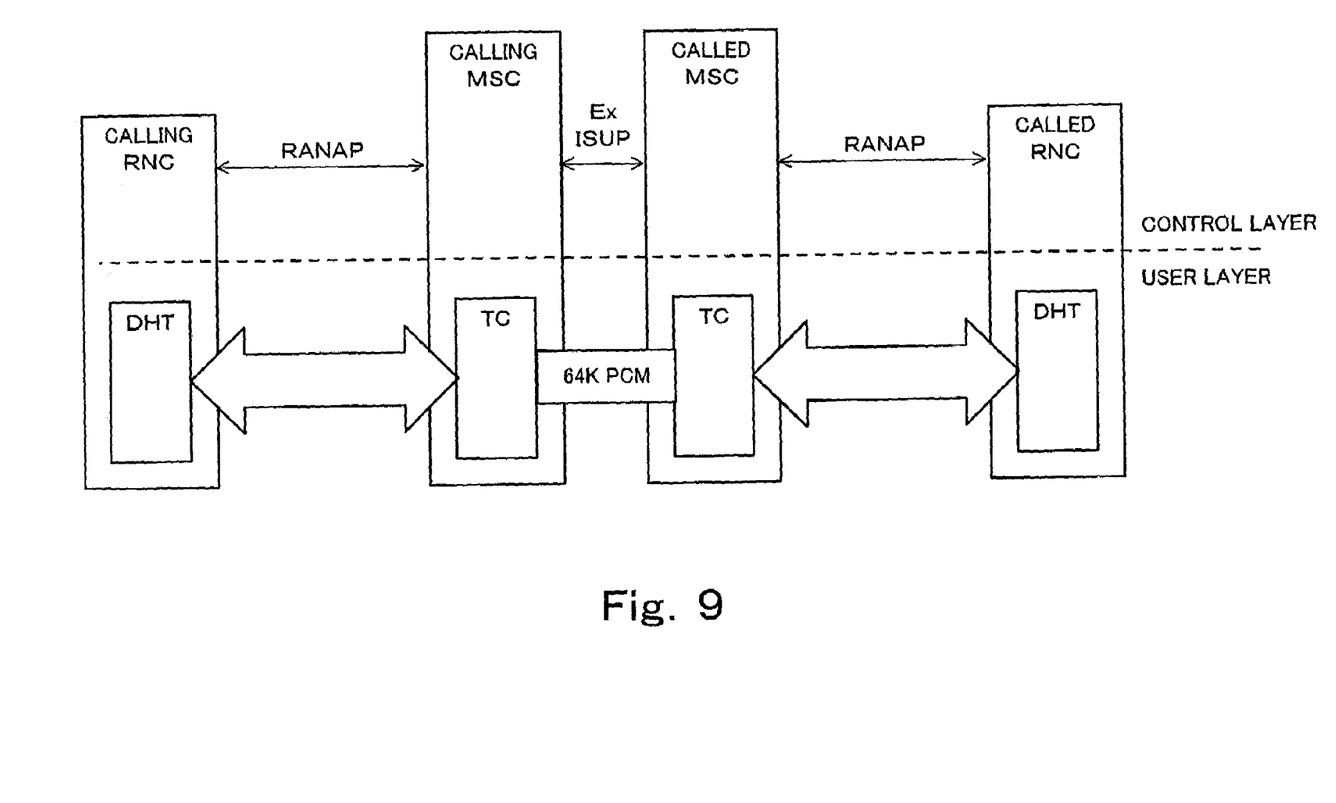
FIG. 9 shows a construction of the present system in a transcoder connection mode.

Since there are communications between the core network and the fixed cable telephone network and between the core network and radio access networks, audio signal is transmitted in the form of a 64 kbps PCM signal within the core network. This is because the audio signal is standardized such that it is transmitted and received as the 64 kbps PCM signal in view of interfaces between the cable telephone network and other networks. On the other hand, in the mobile communication system, in order to effectively utilize radio frequency, which is finite resource, a transmitting audio signal is bandwidth-compressed. A CODEC for bandwidth-compressing the audio signal is provided in each terminal so that the audio signal is transmitted as a signal having narrow band-width, such as 9.6 kbps, in the radio access network. Therefore, a transcoder (TC) is provided in each switching node MSC of the core network, for converting the bandwidth-compressed audio signal into the 64 kbps PCM signal and transmitting the latter in the core network and compression-coding the 64 kbps PCM signal and transmitting the latter to the radio access network so that the conversion between the bandwidth-compressed audio signal and the 64 kbps PCM signal is performed. FIG. 9 shows the system in which the bandwidth-compressed audio signal is transmitted by converting it into the 64 kbps PCM signal by using the transcoder TC.

Assuming that a receiving side is a radio terminal utilizing the same audio signal compression coding system as that used in a transmitting side, a CODEC is inserted into each of at least four locations in a route from a transmitting side to a receiving side. That is, a CODEC in a transmitting terminal, a transcoder of a switching node MSC on the transmitting side, a transcoder of a switching node MSC on the receiving side and a CODEC in the receiving terminal are necessary to code and decode the signal. Therefore, distortion of transmitting signal is accumulated due to the coding and decoding operations of these CODECs, resulting in a degraded audio signal quality. Further, if the transcoders are provided in all of channels of the switching node MSCs, the cost for installing the transcoders is increased and a signal delay occurs due to the signal conversions.

In a case where the same audio signal compression coding system is employed in the respective mobile communication networks, each of the transmitting and receiving terminals has to equip with a CODEC capable of performing the same processing. Therefore, there is no need of converting the audio signal into the 64 kbps PCM signal by inserting the CODEC into each switching node MSC. It is clear that there is no problem if the audio signal is transmitted as a bandwidth-compressed, narrow band signal within the core network without using a transcoder. In such case, it is possible to reduce the cost of installation of the transcoders and to improve the quality of audio signal since the number of the coding and decoding steps is reduced. Therefore, in the mobile communication networks to which the same compression coding system can be applied, a system in which a bandwidth-compressed audio signal is transmitted as it is, without inserting transcoders into the switching nodes in the core network. The latter system is referred to as Transcoder-Free-Operation (TrFO) system.

Figure 10:
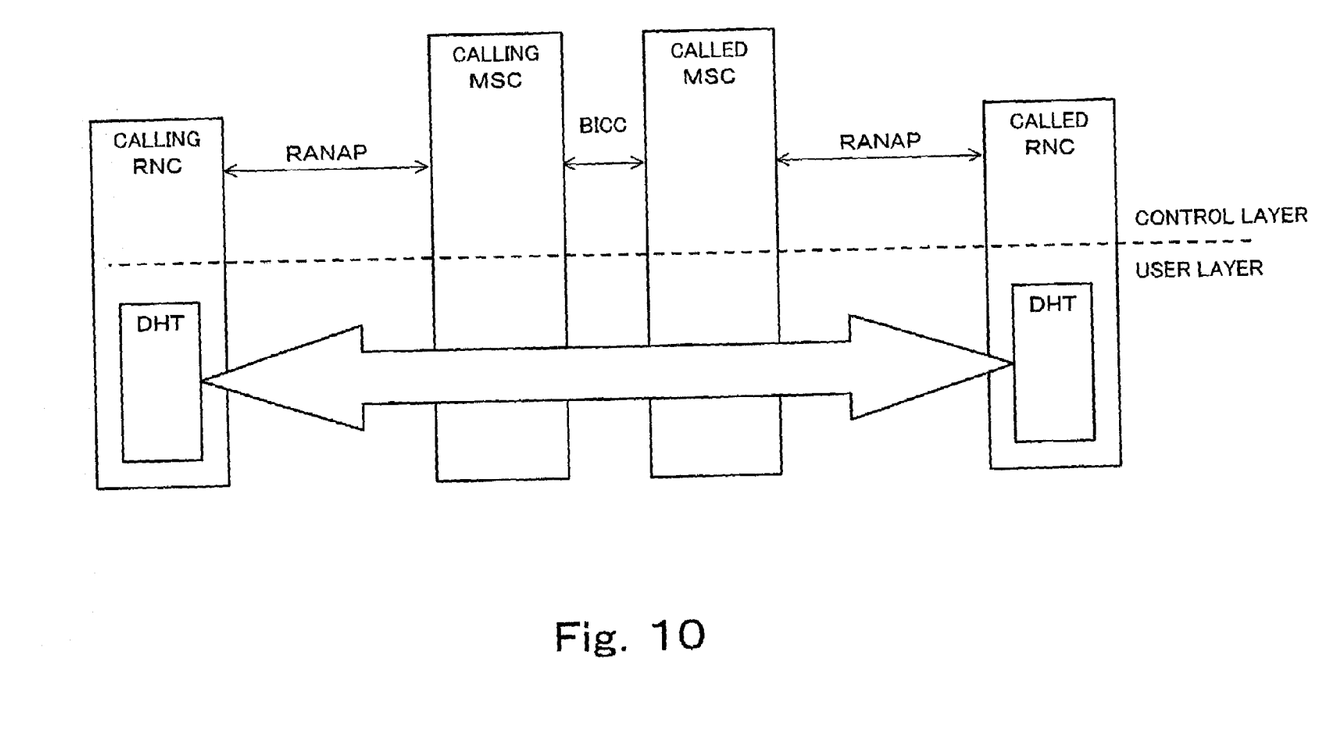
FIG. 10 shows a construction of the present invention in a transcoder-free-operation connection mode.

The Transcoder-Free-Operation system is shown in FIG. 10.

When a switching node MSC is controlling a communication between a transmitting terminal and a receiving terminal by by-passing a transcoder thereof according to the Transcoder-Free-Operation system, there may be a case where a tone signal in an audio frequency band is to be sent to either one or both of the transmitting terminal and the receiving terminal. For example, there is a case where a tone signal indicative of another call is to be inserted into the transmitting and receiving terminals. Further, when a transmitting terminal is of the prepaid system and a prepaid amount is substantially spent, it is necessary to insert a tone signal into the transmitting terminal.

A tone signal generator for generating such tone signal is provided in the switching node MSC in the core network and operates to insert the tone signal into at least one of the communicating terminals. The tone signal generated by the tone signal generator is a 64 kbps PCM signal. Therefore, when the tone signal is inserted into the switching node RNC in which a bandwidth-compressed audio signal communication is performed, it is necessary to convert the 64 kbps PCM audio signal into a bandwidth-compressed, a narrow band audio signal by a transcoder.

In such situation, when the switching node MSC of the core network inserts the transcoder into a call, which is performed through the Transcoder-Free-Operation connection, it is necessary to re-initialize the transcoder between the switching node MSC of the core network and the switching node RNC of the radio access network. This is because the switching node MSC of the core network does not recognize a parameter for the bandwidth compression coding in the call through the Transcoder-Free-Operation connection.

The new mobile communication system, it has been proposed to use an AMR (Adaptive Multi Rate Codec) as the compression coding system. The AMR can dynamically determine the conversion rate in a range from 4.75 kbps to 12.2 kbps, for example. Further, a service class is assigned according to a tolerable error rate. The assignment of the coding frame of the AMR is performed by transmitting a RFCI (Rab sub-Flow Combination Identifier) information, which assigns Service Data Unit (SDU) size of a table describing conversion types between users, by using the user layer and performing a mutual negotiation between a transmitting terminal and a receiving terminal.

As mentioned, in the Transcoder-Free-Operation using the AMR coding system, the setting information of the compression coding is determined by the users by using the user layer of the user interface between the switching node MSC of the core network and the switching node RNC of the radio access network. Therefore, when the switching node MSC of the core network tries to insert the transcoder into a call under communication through the Transcoder-Free-Operation connection, the switching node MSC does not recognize its RFCI information as mentioned previously. Therefore, in order to insert the transcoder into the call under communication through the Transcoder-Free-Operation connection, it is necessary to execute the initializing procedure between the transcoder to be inserted and the switching node RNC of the radio access network. When the re-initializing procedure is executed during the communication, it is necessary to execute a plurality of sequences such as resetting of a Radio Access Bearer between the switching node RNC and the switching node MSC and re-setting of a Radio Access Bearer between the terminal MS and the switching node RNC, etc. Therefore, if the insertion of the transcoder to the call through Transcoder-Free-Operation connection by performing the re-initializing procedures, there is a risk of such as delay of connection and instantaneous cut-off of sound, etc.

SUMMARY OF THE INVENTION

An object of the present invention is to provide a communication system capable of inserting a transcoder into a call through the Transcoder-Free-Operation connection without requiring the re-initializing procedure.

Another object of the present invention is to provide a communication system and a method with which degradation of service, such as connection delay and/or instantaneous sound cut-off, does not occur even when a transcoder is inserted into a call through the Transcoder-Free-Operation connection.

As mentioned previously, the insertion of the transcoder into the call under communication through the Transcoder-Free-Operation connection in the switching node MSC of the core network requires the execution of the initializing procedure since the switching node MSC does not recognize the RFCI information of the AMR coding system, which is necessary in inserting the transcoder. Since the switching node RNC terminates the radio technology, it recognizes the RFCI information for the AMR coding. Therefore, in order to perform the insertion procedure of the transcoder easily without performing the re-initializing procedure, it is enough that the switching node MSC of the core network inquires of the switching node RNC of the radio access network about the RFCI information and sets the RFCI information from the switching node RNC in the transcoder. Since the RFCI information is determined by the user layer of the user interface Iu, it is enough to provide a protocol of the inquiry of the RFCI information to be made by the core network and an answer thereto from the switching node RNC of the radio access network in the user layer. By providing the inquiry protocol in the protocol of the user layer of the user interface Iu, it is possible to insert the transcoder without executing the re-initializing procedure.

Alternatively, it is possible to perform the inquiry from the switching node MSC of the core network to the switching node RNC of the radio access network in not the user layer of the Iu interface but the control layer thereof.

That is, the present invention resides in a communication system comprising a first network including a switching node for transmitting a non-bandwidth compressed signal and a second network including a switching node for transmitting a bandwidth compressed signal. The switching node of the first network includes a transcoder for performing a conversion between the bandwidth-compressed signal and the non-bandwidth-compressed signal and is operable in either a first mode for transmitting the non-bandwidth-compressed signal by inserting the transcoder to perform a conversion between the bandwidth-compressed signal and the non-bandwidth-compressed signal or a second mode for transmitting the bandwidth-compressed signal by by-passing the transcoder. The switching node of the first network includes means for inserting the transcoder in the second mode by inquiring of the switching node of the second network about a setting information of the transcoder and setting the transcoder on the basis of a response from the switching node of the second network.

Further, the present invention resides in a communication system comprising a radio access network including a switching node for transmitting an audio signal as a bandwidth compressed signal and a core network including at least one switching node for transmitting an audio signal as a bandwidth compressed signal. The switching node of the core network includes a transcoder for performing a conversion between the bandwidth-compressed signal and the non-bandwidth-compressed signal and is operable in a Transcoder-Free-Operation connection mode for transmitting and receiving the bandwidth-compressed signal between a calling terminal and a called terminal mutually without using the transcoder according to a negotiation between the calling terminal and the called terminal. The switching node of the core network includes inquiring means, which, when the transcoder is to be inserted into a call in the Transcoder-Free-Operation connection, inquires of the switching node of the radio access network about a setting information of the transcoder for bandwidth-compression, which is set in the call in the Transcoder-Free-Operation connection, and means for setting the transcoder on the basis of the setting information from the switching node of the radio access network and inserting the transcoder.

An audio signal may be bandwidth-compressed in the radio access network by an AMR (Adaptive Multi Rate Coding) system and the setting information for the bandwidth compression may be RFCI information indicative of a value of a mapping table determining a conversion rate of an audio coding frame in the AMR system.

The inquiry of the setting information to be performed by the switching node of the core network may be performed by using a user layer of an Iu interface defined as an interface between the switching node of the core network and the switching node of the radio access network.

Further, the present invention resides in a communication system comprising a radio access network including a switching node for transmitting an audio signal as a bandwidth compressed signal and a core network including at least one switching node for transmitting an audio signal as a non-bandwidth-compressed signal. The switching node of the core network includes a transcoder for performing a conversion between the bandwidth-compressed signal and the non-bandwidth-compressed signal and is operable in a first mode for transmitting the non-bandwidth-compressed signal by inserting the transcoder and converting the bandwidth-compressed signal and the non-bandwidth-compressed signal or a second mode for transmitting the bandwidth-compressed signal by by-passing the transcoder. In the second mode, the switching node of the core network inquires of the switching node of the radio access network about a setting information of the transcoder for the Transcoder-Free-Operation connection, sets the transcoder on the basis of the setting information from the switching node of the radio access network and inserts the transcoder.

The inquiry may be performed by using a user layer of an Iu interface defined as an interface of the switching node of the core network and the switching node of the radio access network and the setting information of the transcoder may be a RFCI information of an AMR (Adaptive Multi Rate Coding) system.

Further, the present invention resides in a switching node operable in either a first mode in which a transcoder is inserted to perform a conversion between a signal bandwidth compressed and a signal not bandwidth compressed or a second mode in which a bandwidth-compressed signal is transmitted by by-passing the transcoder. The switching node comprises means for, in the second mode, inquiring of another switching node about a setting information of the transcoder and inserting the transcoder on the basis of the setting information from the another switching node.

This switching node is a switching node opposing to a switching node of a radio access network in which an audio signal is transmitted as a bandwidth compressed signal and the setting information may be a RFCI in an Adaptive Multi Rate Coding system.

BRIEF DESCRIPTION OF THE DRAWINGS

Preferred embodiments of the present invention will be described with reference to the accompanying drawings, in which.

DETAILED DESCRIPTION OF THE PREFERRED EMBODIMENTS

Figure 1:
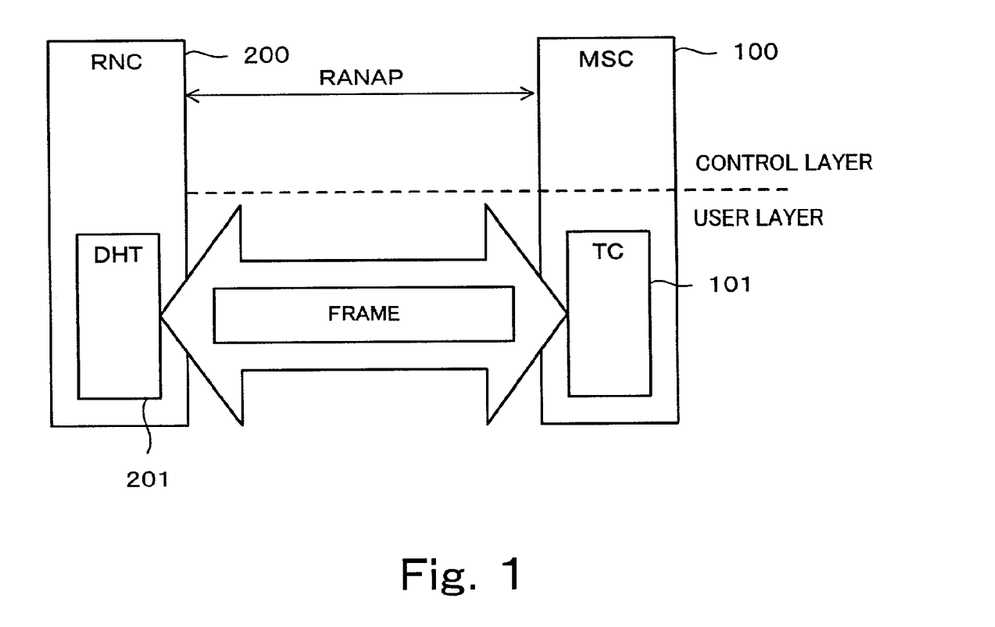
FIG. 1 is a conceptual figure showing a protocol of Iu interface according to the present invention.

FIG. 1 shows a concept of a communication system of the present invention. In FIG. 1, the communication system includes a core network having a switching node MSC 100 and a radio access network having a switching node RNC 200. The switching node MSC 100 of the core network and the switching node RNC 200 of the radio access network transmit and receive an AMR frame each other according to a protocol of a user layer of a user interface Iu. A transcoder TC 101 is included in the switching node MSC 100. The transcoder TC 101 functions to convert an audio signal from the radio access network, which is bandwidth-compressed according to the AMR coding, into a 64 kbps PCM signal and to convert a 64 kbps PCM signal from the core network into the AMR coded signal. A Diversity Handover Trunk (DHT) 201 of the switching node RNC of the radio access network takes iys share of a handover function in a diversity operation mainly.

The user interface Iu uses AAL2 (ATM Adaptation Layer type 2) in ATM (Asynchronous Transfer Mode) and an inquiry of RFCI parameter of AMR code is performed by using a layer defined as a user layer of the Iu interface.

First Embodiment

Figure 2:
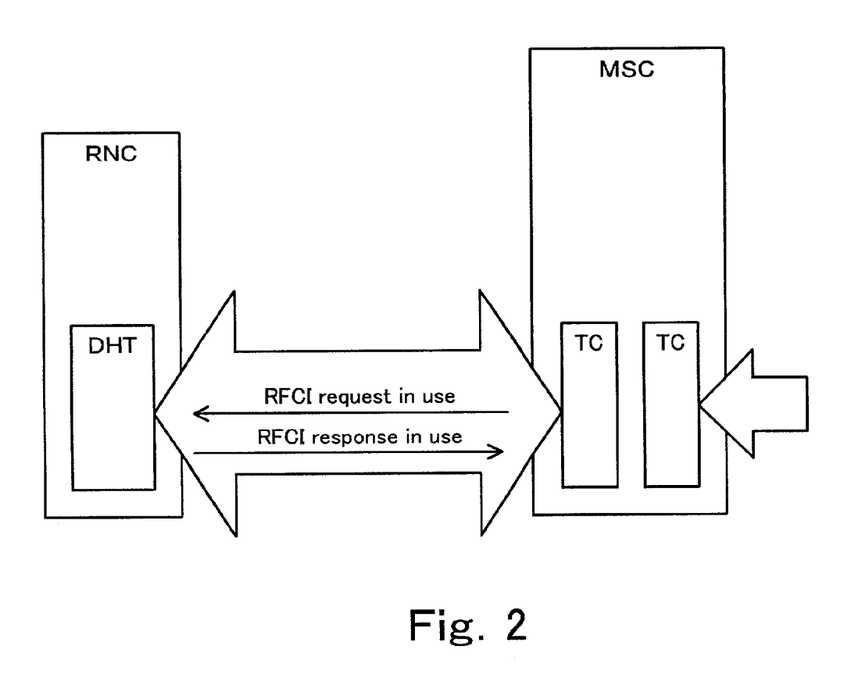
FIG. 2 illustrates an inquiry operation of RFCI information in a first embodiment of the present invention.

An example in which a communication is changed from a call through the transcoder-free-operation connection to a communication between three talkers by inserting a transcoder will be described with reference to FIGS. 2 to 4.

For example, during a communication between two talkers through the transcoder-free-operation connection, a communication path is formed by by-passing the transcoder TC of the switching node MSC 100. In such case, when it is desired to introduce the third party using a 64 kbps PCM signal into the communication to realize a communication between three talkers, it is necessary to insert transcoders into the two terminals, which are using the AMR coded audio signal, respectively, to connect them to one terminal of a three-talker communication trunk 104 and to connect the other terminal of the trunk 104 to a trunk on the side of the third talker.

An example of this operation will be described with reference to a flowchart shown in FIG. 4. It is assumed that talkers A and B are communicating with each other through the transcoder-free-operation. It is further assumed that, in such state, there is a call from a talker C using a fixed telephone to join the communication between the talkers A and B.

When there is a request call of three-talker communication from the third talker C, a three-talker communication trunk 104 is caught in the switching node MSC and one terminal of the trunk 104 is connected to a trunk of a communication path to the C and simultaneously two transcoders for the A and B are caught. When the two transcoders for the A and B are caught, an inquiry of the switching nodes RNC 200 of the radio access networks, to which the A and B belong, about RFCI information used in the connection call between the A and B is performed in the user layer of the Iu interface. Although the switching node MSC 100, which is being switched to the three-talker communication, does not recognize the RFCI information currently in use, the switching node NSC 200 recognizes the RFCI information currently used in the radio access network. In response to the inquiry, the switching node RNC sends a value of the RFCI parameter to the switching node MSC. The switching node MSC 100 sets the transcoders on the basis of the RFCI thus acquired and connect the two transcoders to the three-talker communication trunk 104. Thus, the three-talker communication using the 64 kbps PCM signal is realized.

Figure 3:
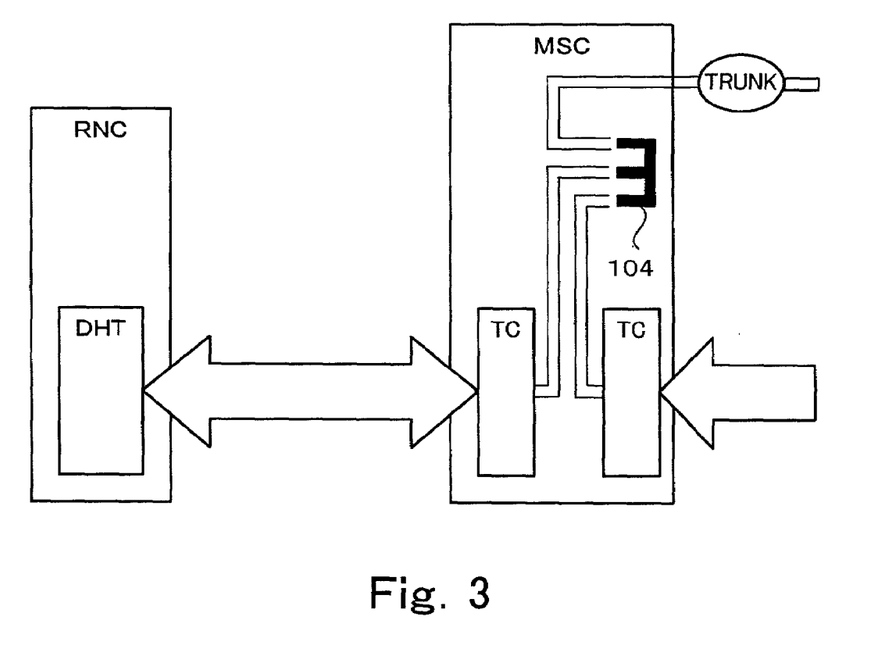
FIG. 3 illustrates an insertion of a trunk for three-talker situation in the first embodiment of the present invention.
Figure 4:
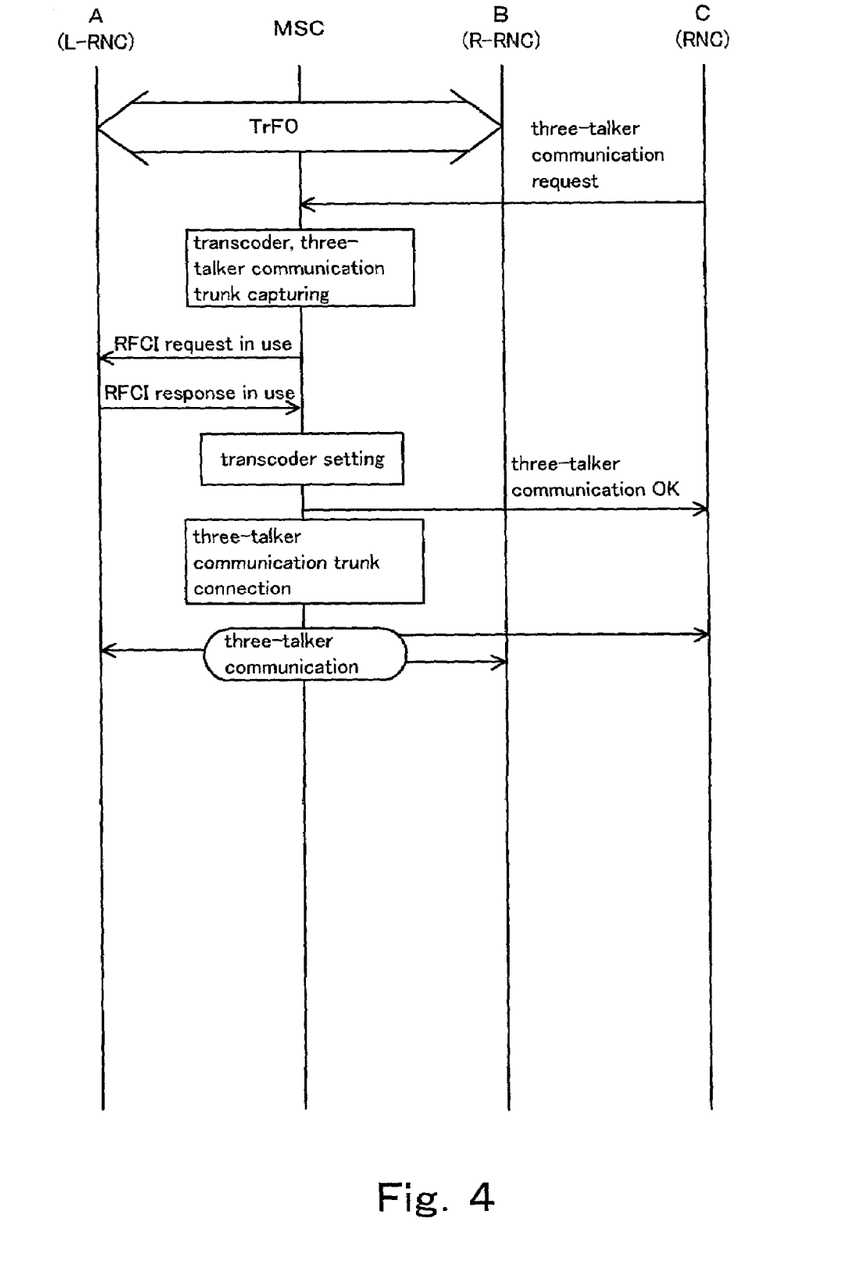
FIG. 4 is a flowchart for inserting the three-talker trunk in the first embodiment of the present invention.

In FIGS. 3 and 4, the switching node MSC of the core network inquires of one of the switching nodes RNC to which the respective A and B belong, about the RFCI information. However, the switching node MSC 100 may inquire of both the switching nodes RNC about the RFCI information. Incidentally, the switching node MSC 100 and the switching node RNC 200 can transmit/receive the RFCI information by means of only the user layer protocol of the Iu interface.

In a case where there is a call from a third party during the transcoder-free-operation connection between two talkers and a tone signal indicative of the call is sent to the talkers, one terminal of the three-talker communication trunk 104 is connected to a 64 kbps PCM tone signal generator and the other terminal of the trunk is connected to the talkers by inserting the transcoders, similarly to the procedure for realizing the three-talker communication.

Second Embodiment

Figure 5:
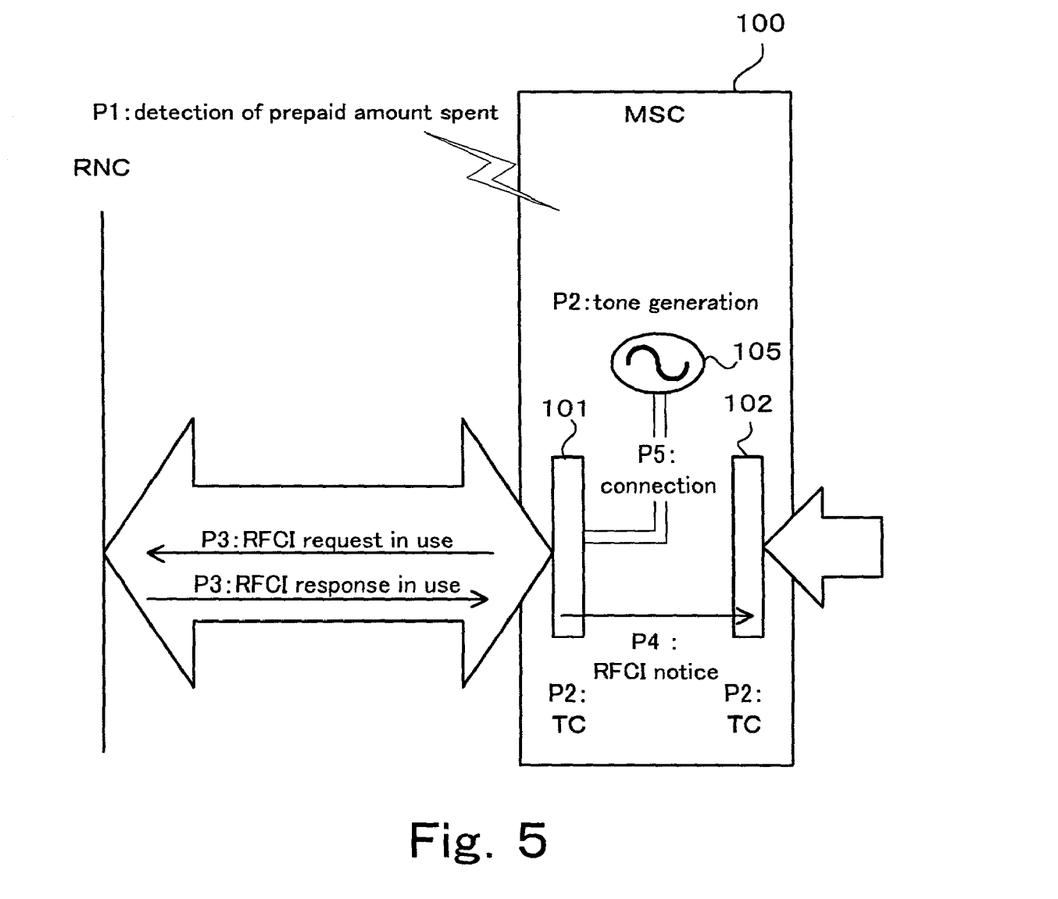
FIG. 5 illustrates a tone inserting operation to be performed at a time when a prepaid amount is almost spent in a second embodiment of the present invention.
Figure 6:
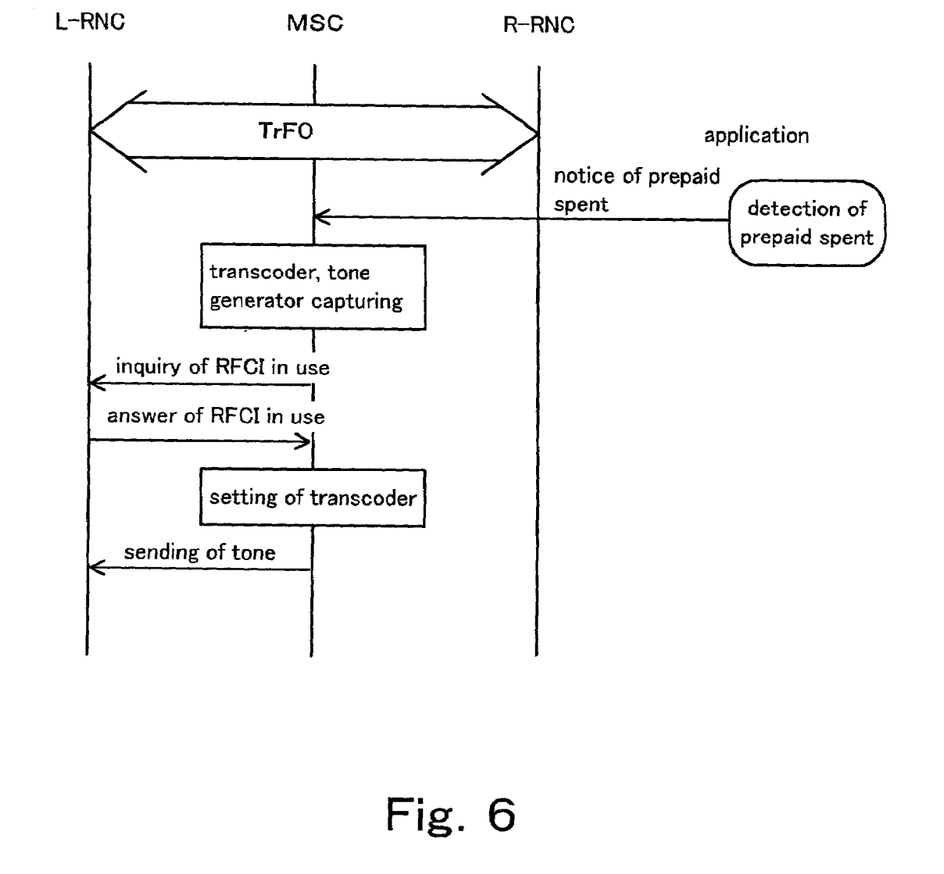
FIG. 6 is a flowchart showing the tone inserting operation when the prepaid amount is spent in the second embodiment of the present invention.

Now, a second embodiment of the present invention will be described with reference to FIGS. 5 to 7. The second embodiment is a construction in which a calling terminal subscriber is a pre-paid type terminal and a tone signal is to be sent to the subscriber when a pre-paid amount is almost sent.

Procedures for realizing this function will be described.

When an application for performing a pre-paid processing detects a situation that a residual of an amount prepaid by a subscriber of the prepaid system is reduced substantially, a tone connection of extinction of prepaid amount is requested by this application (p1). Upon the detection of the extinction of prepaid amount, the switching node MSC 100 of the core network catches a tone generator 105 and transcoders 101 and 102 and connect them to bi-directional switching nodes (p2). The RFCI negotiation procedure is started by utilizing the transcoder 101 connected to the switching node RNC 200 on the near side (local side) (p3). This negotiation is performed as the user layer protocol of the Iu interface and the switching node MSC 100 inquires of the switching node RNC about the RFCI information in use. Against this inquiry, the switching node RNC sends the RFCI information in use. The RFCI information acquired by this inquiry is also noticed to the transcoder connected to the switching node RNC on the remote side (p4). Finally, the tone generator 105 is connected to the transcoder 101 so that the subscriber can hear the tone sound (p5).

Figure 7:
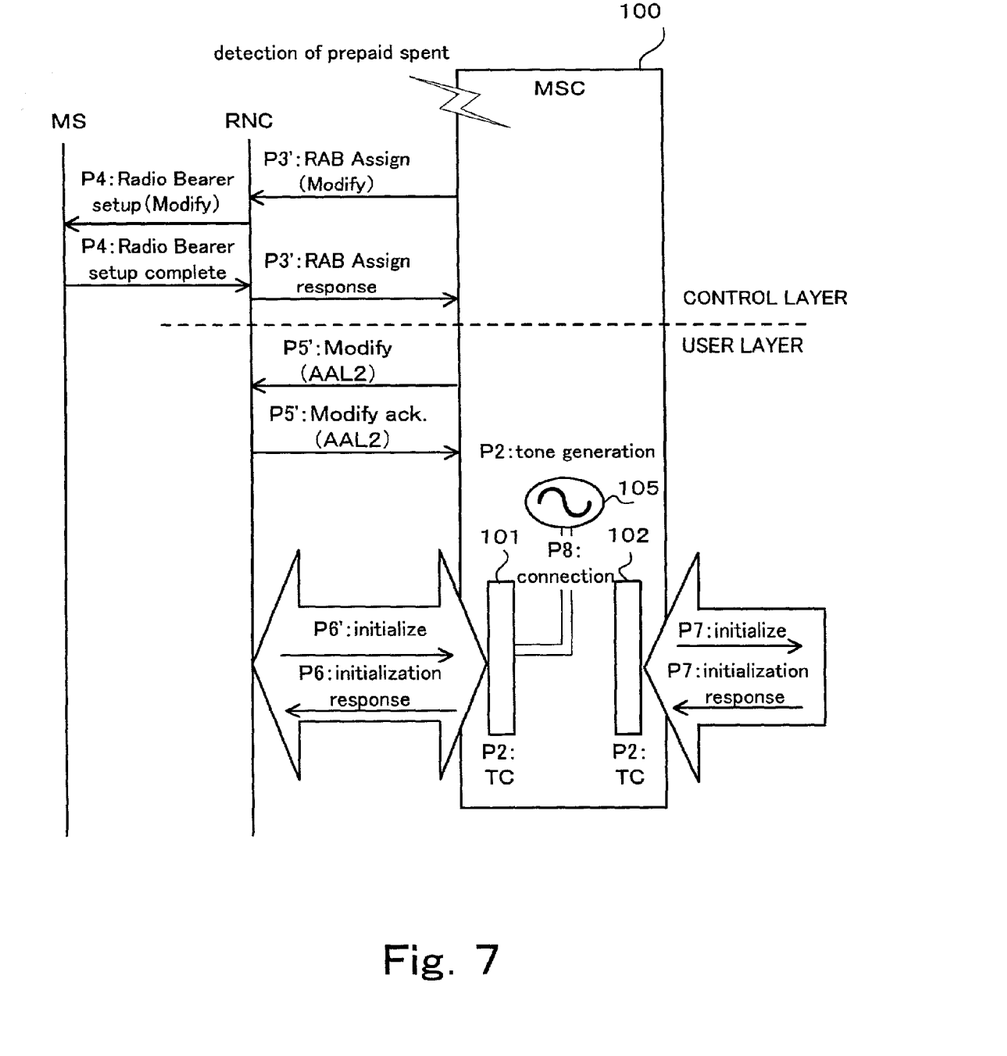
FIG. 7 illustrates a tone inserting operation when a prepaid amount is spent in a conventional system.

FIG. 7 shows an example of procedures of the conventional system for noticing a prepaid system subscriber of a reduced residual (or extinction) of prepaid amount by performing the re-initialization between switching nodes.

In this conventional system, the catching procedures p1 and p2 of a tone generator 105 and transcoders 101 and 102, which are performed by a switching node MSC 100 when the prepaid amount extinction is detected are the same as those of the present invention. Thereafter, the re-setting procedure of the Radio Access Bearer (RAB) between the switching node MSC 100 and the switching node RNC 200 is performed in the conventional system (p3'). Further, a re-setting procedure of a radio bearer on the Radio Resource Control (RRC) protocol between a terminal MS and the switching node RNC is performed (p4'). This procedure p4' is ganged with the procedure p3'. Upon the re-set RAB, a bearer change of the AAL2 link of the ATM corresponding thereto is performed (p5'). With the bearer established, the initializing processing in the user layer of the Iu interface is performed (p6') and the transcoder 102 connected to the remote side switching node RNC is re-set (p7'). The procedure p7' is activated in parallel to the procedures p3' to p6'. Finally, the prepaid system subscriber can hear the tone by connecting the tone generator 105 to the transcoder 101.

Comparing the present communication with the procedures performed in the conventional system shown in FIG. 7, it is possible according to the present invention to insert the transcoder into the call of the transcoder-free-operation connection without necessity of the re-setting of the bearer between the switching node MSC and the switching node RNC, the re-setting of the bearer between the MS and the switching node RNC, the initializing processing between the local side switching node RNC and the switching node MSC and the initializing processing between the remote side switching node RNC and the switching node MSC.

Although, in the second embodiment, the inquiry of the RFCI information is performed in the user layer of the Iu interface protocol, it is possible to perform the same by using the control layer thereof, that is, the Radio Access Network Application Part (RANAP).

As described hereinbefore, according to the present invention, it is possible to insert a transcoder into a call of transcoder-free-operation connection without using the re-initializing processing. Therefore, it is possible to prevent occurrence of the problems such as delay of connection and instantaneous cut-off of sound, etc., due to the re-setting processing of the bearer between the switching nodes and the re-setting processing between the MS and the switching node, which are performed during a communication to re-initialize the system.

Further, according to the present invention, the procedure for insertion of the transcoder is simplified and the number of messages to be used can be reduced. Therefore, the processing therefor can be simplified.

What is claimed is:

1. A communication system comprising a first network including a switching node for transmitting a non-bandwidth-compressed signal and a second network including a switching node for transmitting a bandwidth-compressed signal, said switching node of said first network including a transcoder for performing a conversion between the bandwidth-compressed signal and the non-bandwidth-compressed signal, said switching node of said first network being operable in one of a first mode for transmitting the non-bandwidth compressed signal by inserting said transcoder to convert the bandwidth compressed signal into the non-bandwidth-compressed signal and a second mode for transmitting the bandwidth-compressed signal by by-passing said transcoder, said switching node of said first network including means for inserting said transcoder in said second mode by inquiring of said switching node of said second network about a setting information of said transcoder and setting said transcoder on the basis of a response from said switching node of said second network.

2. A communication system comprising a radio access network including a switching node for transmitting an audio signal as a bandwidth-compressed signal and a core network including at least one switching node for transmitting an audio signal as a bandwidth-compressed signal, said switching node of said core network including a transcoder for performing a conversion between the bandwidth-compressed signal and the non-bandwidth-compressed signal, said switching node of said core network being operable in a transcoder-free-operation connection mode for transmitting and receiving the bandwidth-compressed signal between a calling terminal and a called terminal mutually according to a negotiation between said calling terminal and said called terminal by by-passing said transcoder, wherein said switching node of said core network including means for inquiring of said switching node of said radio access network about a setting information of said transcoder for bandwidth-compression set in a call in said transcoder-free-operation connection when said transcoder is inserted for the call of said transcoder-free-operation connection and means for setting said transcoder on the basis of the setting information from said switching node of said radio access network and inserting said transcoder.

3. A communication system as claimed in claim 2, wherein the audio signal is bandwidth compressed in said radio access network by an adaptive multi rate coding system, the setting information for the bandwidth compression comprises rab sub-flow combination identifier information indicative of a value of a mapping table determining a conversion rate of an audio coding frame in the adaptive multi rate coding system.

4. A communication system as claimed in claim 2, wherein the inquiry of the setting information is performed by using a user layer of an Iu interface defined as an interface between said switching node of said core network and said switching node of said radio access network.

5. A communication system comprising a radio access network including a switching node for transmitting an audio signal as a bandwidth compressed signal and a core network including at least one switching node for transmitting an audio signal as a bandwidth compressed signal, said switching node of said core network including a transcoder for performing a conversion between the bandwidth compressed signal and the non-bandwidth-compressed signal, said switching node of said core network being operable in a first mode for transmitting the non-bandwidth-compressed signal by inserting said transcoder to perform a conversion between the bandwidth-compressed signal into the non-bandwidth-compressed signal or a second mode for transmitting the bandwidth-compressed signal by by-passing said transcoder, wherein switching node of said core network inquires of said switching node of said radio access network about a setting information of said transcoder for said transcoder-free-operation connection in said second mode, sets said transcoder on the basis of the setting information from said switching node of said radio access network and inserting said transcoder.

6. A communication system as claimed in claim 5, wherein said inquiry is performed by using a user layer of an Iu interface defined as an interface of said switching node of said core network and said switching node of said radio access network.

7. A communication system as claimed in claim 5, wherein said setting information of said transcoder comprises rab sub-flow combination identifier information of an adaptive multi rate coding system.

8. A switching node operable in one of a first mode in which a transcoder is inserted to perform a conversion between a bandwidth-compressed signal and a non-bandwidth-compressed signal and a second mode in which a bandwidth-compressed signal is transmitted by by-passing said transcoder, comprising means for, in said second mode, inquiring of another switching node about a setting information of said transcoder and inserting said transcoder on the basis of the setting information from said another switching node.

9. A switching node as claimed in claim 8, wherein said switching node comprises a switching node opposing to a switching node of a radio access network in which an audio signal is transmitted as a bandwidth-compressed signal and the setting information comprises rab sub-flow combination identifier information in an adaptive multi rate coding system.

10. A method for inserting a transcoder of a switching node operable in one of a first mode in which said transcoder is inserted to perform a conversion between a bandwidth-compressed signal and a non-bandwidth-compressed signal and a second mode in which a bandwidth-compressed is transmitted by by-passing said transcoder, wherein, in said second mode, said switching node inquires of another switching node about a setting information of said transcoder and inserting said transcoder on the basis of the setting information from said another switching node.

11. A method as claimed in claim 10, wherein said switching node comprises a switching node opposing to a switching node of a radio access network in which an audio signal is transmitted as a bandwidth compressed signal and the setting information comprises rab sub-flow combination identifier information in an adaptive multi rate coding system.

* * * * *